(12) United States Patent
Schwartz

(10) Patent No.: US 10,445,605 B2
(45) Date of Patent: *Oct. 15, 2019

(54) BIOMETRIC AUTHENTICATION OF ELECTRONIC SIGNATURES

(71) Applicant: EZEE STEVE, LLC, Fort Lauderdale, FL (US)

(72) Inventor: Steven R. Schwartz, Fort Lauderdale, FL (US)

(73) Assignee: EZEE STEVE, LLC, Fort Lauderdale, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/132,019

(22) Filed: Sep. 14, 2018

(65) Prior Publication Data

US 2019/0213430 A1  Jul. 11, 2019

Related U.S. Application Data

(63) Continuation of application No. 15/867,519, filed on Jan. 10, 2018, now Pat. No. 10,108,870.

(51) Int. Cl.
*G06K 9/00* (2006.01)
*G06K 9/03* (2006.01)

(52) U.S. Cl.
CPC ..... *G06K 9/00892* (2013.01); *G06K 9/00422* (2013.01); *G06K 9/00979* (2013.01); *G06K 9/03* (2013.01)

(58) Field of Classification Search
CPC .......... G06K 9/00892; G06K 9/00422; G06K 9/00979; G06K 9/03
See application file for complete search history.

(56) References Cited

U.S. PATENT DOCUMENTS

| | | | | |
|---|---|---|---|---|
| 9,558,416 B2* | 1/2017 | Waters | ............... | G06K 9/00892 |
| 2004/0221162 A1* | 11/2004 | Kongtcheu | ............. | G06F 21/64 |
| | | | | 713/178 |
| 2013/0132230 A1* | 5/2013 | Gibson | ............. | G06Q 30/0627 |
| | | | | 705/26.8 |
| 2014/0003675 A1* | 1/2014 | Li | ........................... | G06F 21/32 |
| | | | | 382/123 |
| 2015/0010216 A1* | 1/2015 | Papastefanou | ..... | G06K 9/00154 |
| | | | | 382/120 |
| 2015/0012812 A1* | 1/2015 | Wu | ..................... | G06F 17/2247 |
| | | | | 715/234 |
| 2016/0162697 A1* | 6/2016 | Follis | .................... | H04L 9/3247 |
| | | | | 726/28 |
| 2016/0248765 A1* | 8/2016 | Saxena | ............... | H04L 63/0861 |
| 2018/0060879 A1* | 3/2018 | Waters | ............... | G06K 9/00892 |

OTHER PUBLICATIONS

Garcia-Salicetti, Sonia, "BIOMET: A Multimodal Person Authentication Database Including Face, Voice, Fingerprint, Hand, and Signature Modalities" AVBPA 2003. (Year: 2003).*

* cited by examiner

*Primary Examiner* — Kim Y Vu
*Assistant Examiner* — Molly Delaney
(74) *Attorney, Agent, or Firm* — Boswell IP Law; James Mason Boswell

(57) ABSTRACT

At least one contemporaneous signature image is captured while a user generates an electronic signature for a document. When one or more contemporaneous signature images maps to a verification image, signature data representative of an electronic signature is associated with the document.

16 Claims, 6 Drawing Sheets

BIOMETRIC AUTHENTICATION OF ELECTRONIC SIGNATURES

CROSS REFERENCE TO RELATED APPLICATIONS

This application is a continuation of pending U.S. non-provisional patent application Ser. No. 15/867,519 entitled "Biometric Electronic Signatures" and filed Jan. 10, 2018, which is hereby incorporated by reference.

BACKGROUND INFORMATION

As commerce has increasingly become digital, the ability to view and sign documents electronically has become desirable. Various businesses have offered services that allow users to generate an electronic signature to be applied to a document in a process sometimes referred to as "e-signature" or "e-sign." While e-signatures are generally more efficient than getting a traditional "wet signature" on a piece of physical paper where the document needs to be mailed back and forth, there are security and fraud concerns associated with e-signatures. Therefore, systems and devices enhancing verification and/or authentication of electronic signatures are desirable.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of systems, devices, and methods for enhancing verification and/or authentication of electronic signatures are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise.

Embodiments of this disclosure are directed to enhancing the verification or authentication of an electronic signature by using a biometric image captured contemporaneously with a user's generation of an electronic signature. For the purposes of this disclosure, the terms "electronic signature" and "e-signature" shall be used interchangeably. The biometric image may be of all or a portion of a user's face, a user's finger, or a user's retina, for example. The contemporaneously captured biometric image can then be compared to a verified biometric image associated with the user. In one illustrative example, one or more images are captured of a user as they generate an e-signature (either handwritten electronic signature or typed electronic signature). One or more of the contemporaneous captured images is compared to a verification image or verification data (e.g. facial mapping) representative of the verification image. If the contemporaneously captured image(s) maps to (is sufficiently similar) to the verification image or verification data, then the electronic signature that the user generated can be successfully associated with the document that the user was e-signing.

The techniques described herein may be implemented in a number of ways. Example implementations are provided below with reference to the following FIGS. 1-6.

Figure 1:
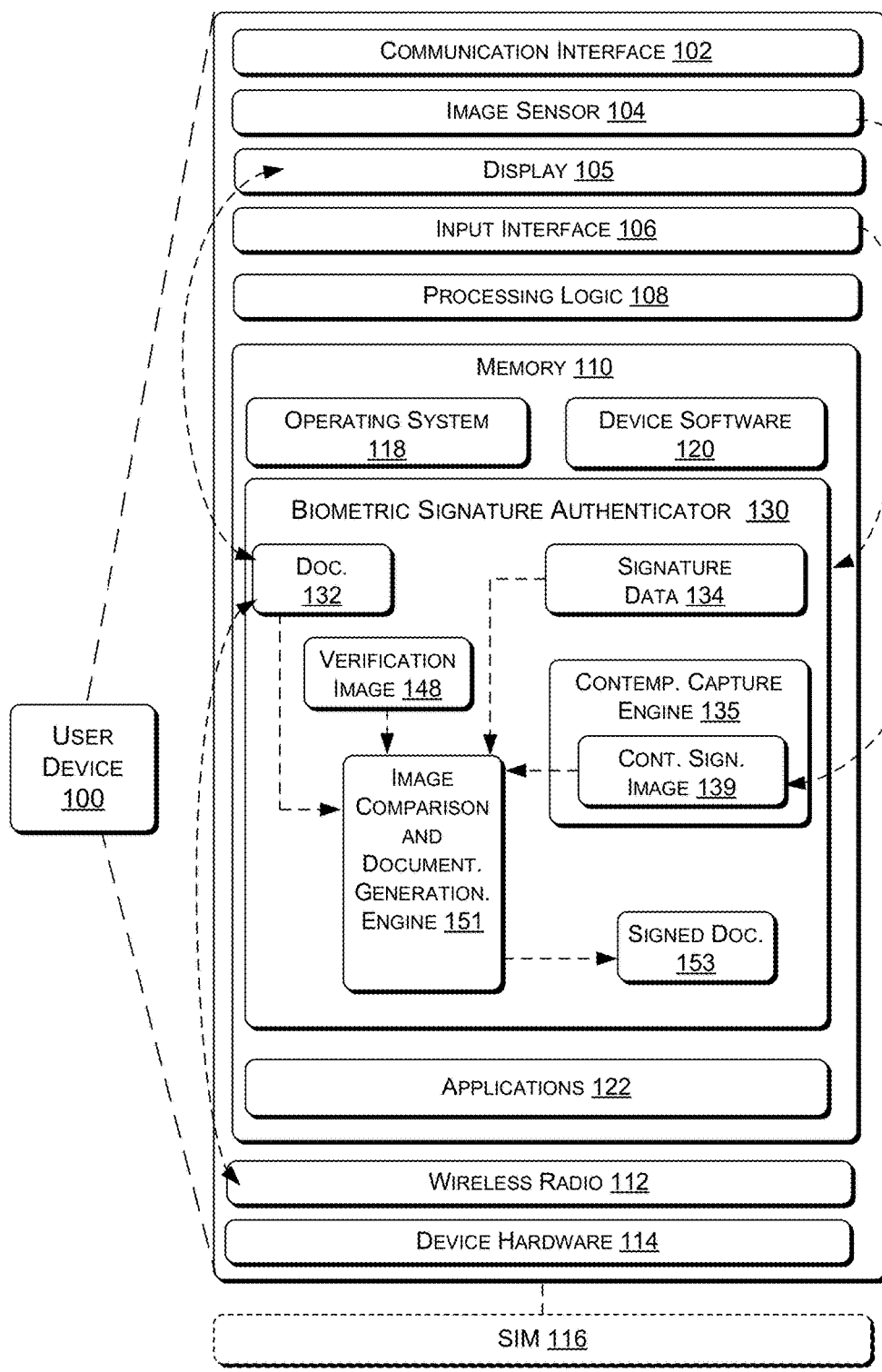
FIG. 1 illustrates a block diagram of an example user device for biometric authentication of an e-signature, in accordance with an embodiment of the disclosure.

FIG. 1 illustrates a block diagram of an example user device 100 for biometric authentication of an e-signature, in accordance with an embodiment of the disclosure. The illustrated example user device 100 may include a communication interface 102, an image sensor 104, a display 105, an input interface 106, processing logic 108, and memory 110. The communication interface 102 may include wireless and/or wired communication components that enable the user device 100 to transmit or receive voice or data communication via a wireless carrier network as well as other telecommunication and/or data communication networks. Communication interface 102 may include chips to facilitate IEEE 802.11 protocols and/or BlueTooth communication, for example. User device 100 may also include sensors (not illustrated) including a proximity sensor, a compass, an accelerometer, altimeter, and/or a global positioning system (GPS) sensor. The compass, the accelerometer, and the GPS sensor may detect orientation, movement, and geolocation of the user device 100. User device 100 may be a tablet, smartphone, laptop computer, desktop computer, or otherwise.

Image sensor 104 may be a complementary metal-oxide-semiconductor (CMOS) image sensor for capturing images. Image sensor 104 may be a forward-facing or rear-facing image sensor. Complimentary optics may also be included to give image sensor 104 camera functionality. Display 105 may be a liquid crystal display (LCD) or an organic light-emitting-diode (OLED) display, for example. Display 105 may be disposed to emit display light on a same side of the device 100 that the image sensor 104 receives imaging light. Input interface 106 may enable a user to provide inputs to user device 100. The data input devices may include, but are not limited to, combinations of one or more of keypads, keyboards, mouse devices, touchscreens, touchpad, microphones, speech recognition packages, and any other suitable devices or other electronic/software selection methods. A touchscreen included in the input interface may be layered with (e.g. overlaying) the display 105. The touchscreen may be a capacitive or resistive touchscreen, for example.

Device hardware 114 may include other hardware that is typically located in a user device (e.g. a smartphone). For example, the device hardware 114 may include signal converters, transceivers, antennas, hardware decoders and encoders, graphic processors, a SIM card slot, and/or the like that enable the user device 100 to execute applications and provide telecommunication and data communication functions. The SIM 116 may be an integrated circuit chip that is inserted into the SIM card slot of the user device 100, or an embedded SIM that is hardwired into the circuit board of the user device 100.

Processing logic 108 may be coupled to drive images onto display 105, and coupled to the image sensor 104 to initiate image captures and receive image capture data from the image sensor 104. Processing logic 108 is coupled to receive the user inputs from input interface 106. Processing logic 108 is communicatively coupled to communication interface 102 and wireless radio 112 to facilitate communication. Wireless radio 112 may specifically facilitate cellular data protocols such as 3G, 4G, LTE, and/or 5G. Processing logic 108 may include one or more processors, microprocessors, multi-core processors, and/or Field Programmable Gate Arrays (FPGAs) to execute operations disclosed herein. In some embodiments, memories (not illustrated) are integrated into the processing logic 108 to store instructions to execute operations and/or store data. Processing logic 108 may include analog or digital circuitry to perform the operations disclosed herein. Processing logic 108 may be coupled to read and/or write data to memory 110 and execute instructions stored in memory 110.

The memory 110 may be implemented using computer-readable media, such as computer storage media. Computer-readable media may include two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital optical disks or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processing logic 108 and the memory 110 of the user device 100 may implement an operating system 118, device software 120, and/or one or more applications 122. The various software and applications may include routines, program instructions, objects, and/or data structures that perform particular tasks or implement particular abstract data types. The operating system 118 may include components that enable the user device 100 to receive and transmit data via various interfaces (e.g., user controls, communication interface 102, and/or memory input/output devices). The operating system 118 may also process data using the processing logic 108 to generate outputs based on inputs that are received via the input interface 106. For example, the operating system 118 may provide an execution environment for the execution of the applications 122. The operating system 118 may include a presentation component that presents the output (e.g., display the data on an electronic display, store the data in memory, transmit the data to another electronic device, etc.).

The operating system 118 may include an interface layer that enables applications to interface with the wireless radios 112 and/or the communication interface 102. The interface layer may comprise public APIs, private APIs, or a combination of both public APIs and private APIs. Additionally, the operating system 118 may include other components that perform various other functions generally associated with an operating system. The device software 120 may include software components that enable the user device to perform functions. For example, the device software 120 may include basic input/output system (BIOS), Boot ROM, or a bootloader that boots up the user device 100 and executes the operating system 118 following power up of the device.

The applications 122 may include applications that provide utility, entertainment, and/or productivity functionalities to a user of the user device 100. For example, the applications 122 may further include electronic mail applications, remote desktop applications, web browser applications, navigation applications, office productivity applications, audio streaming applications, video streaming applications, and/or so forth.

Memory 110 includes biometric signature authenticator 130, in FIG. 1. In the illustrated embodiment, biometric signature authenticator 130 includes document 132, signature data 134, contemporaneous capture engine 135, verification image 148, image comparison and document generation engine (ICDGE) 151, and signed document 153. Contemporaneous capture engine 135 receives a contemporaneous signature image 139 captured by image sensor 104. In FIG. 1, the biometric authentication of the e-signature is performed by the user device 100.

Device 100 may receive a document 132 for signing. Document 132 may be provided to user device 100 by a remote server and received via communication interface 102 and/or wireless radio 112, for example. Processing logic 108 may cause document 132 to be rendered to display 105 for viewing by a user of the user device 100. A signature block interface for the user to e-sign the document may be rendered to display 105 simultaneously with the document 132. In one embodiment, a signature block interface for the user to e-sign is rendered after the user has reviewed the document 132. The user can generate their e-signature in the signature block interface by interacting with input interface 106 to provide a signature input. For example, a user can type their name (sometimes also including a forward slash at the beginning and ending of typing their name) using a physical keyboard or software keyboard, or generate a handwritten signature by "signing" a touchpad or a touchscreen with their finger or stylus. A digital representation of the signature input is stored as signature data 134. In the case of a typed e-signature, signature data may be a "string" of characters. For handwritten e-signatures, the signature data 134 may be an image of the handwritten e-signature recorded by the touchpad/touchscreen. The signature input is received by input interface 106 subsequent to the document 132 being rendered to display 105.

In response to first receiving the signature input at input interface 106, contemporaneous capture engine 135 causes image sensor 104 to capture one or more contemporaneous signature images 139 to capture the user inputting the remainder of the electronic signature or the typed electronic signature. For example, contemporaneous capture engine 135 may trigger image sensor 104 to begin image capture of contemporaneous signature image 139 when the user types the first slash in a typed e-signature or when the user first contacts the touchpad or portion of the touchscreen assigned to a signature block. Therefore, contemporaneous signature image(s) 139 will be captured while the user is in the act of e-signing document 132.

Contemporaneous signature image(s) 139 may be captured by a front-facing camera on a smartphone or tablet and thus capture an image of the user's face as they e-sign. Contemporaneous signature image(s) 139 may be captured by a web camera included in a laptop computer or desktop computer and thus capture an image of the user's face as they e-sign. Contemporaneous signature image(s) 139 may include an image of the eye of the user. Contemporaneous signature image(s) 139 may include an image of the fingertip of the user. The image of the fingertip of the user may be captured when a fingerprint scanner includes optics directing the image light from a fingertip to the image sensor 104.

Image comparison and document generation engine (ICDGE) 151 receives document 132, signature data 134, contemporaneous signature image(s) 139, and verification image(s) 148. Verification image(s) 148 may be stored locally in memory 110 or be provided to user device 100 by a remote server. In one embodiment, prior to engaging in e-signing document 132, the user captures verification image(s) of the user's face, eyes, and/or fingertips to serve as verification image(s). At least one contemporaneous signature image 139 is compared to at least one of the verification images 148. The signature data 134 is associated with document 132 when the contemporaneous signature image 139 maps to (is sufficiently similar to) the verification image 148. In one embodiment, data subsets or mappings of the images 139 and 148 may be compared to one another to determine whether the contemporaneous signature image 139 is sufficiently similar to verification image 148.

In one embodiment, comparing the contemporaneous signature image 139 to the verification image 148 includes transmitting, with the communication module, a verification request from user device 100 to another computing device (e.g. a remote server) and receiving the verification image from the computing device. The verification request may be transmitted by the communication interface 102 and the verification image may be received by the communication interface 102. The verification request may include user credentials of the user of user device 100, in some embodiments.

In on embodiment, comparing the contemporaneous signature image 139 from the verification image 148 of the user includes accessing the verification image 148 from a user profile stored in the memory 110.

When the contemporaneous signature image 139 maps to the verification image 148, ICDGE 151 associates signature data 134 with document 132. In the illustrated embodiment of FIG. 1, ICDGE 151 generates a signed document 153 that includes the signature data 134 into document 132. When contemporaneous signature image 139 fails to map to verification image 148, signature data 134 is not associated with document 132 and document 132 remains unsigned. Therefore, a user of user device 100 that does not have biometrics mapped to verification image 148 will not be able to e-sign document 132 while a user with biometrics mapped to verification image 148 will be able to e-sign document 132. In this way, security for e-signatures can be enhanced by only allowing verified users to e-sign documents.

Figure 2:
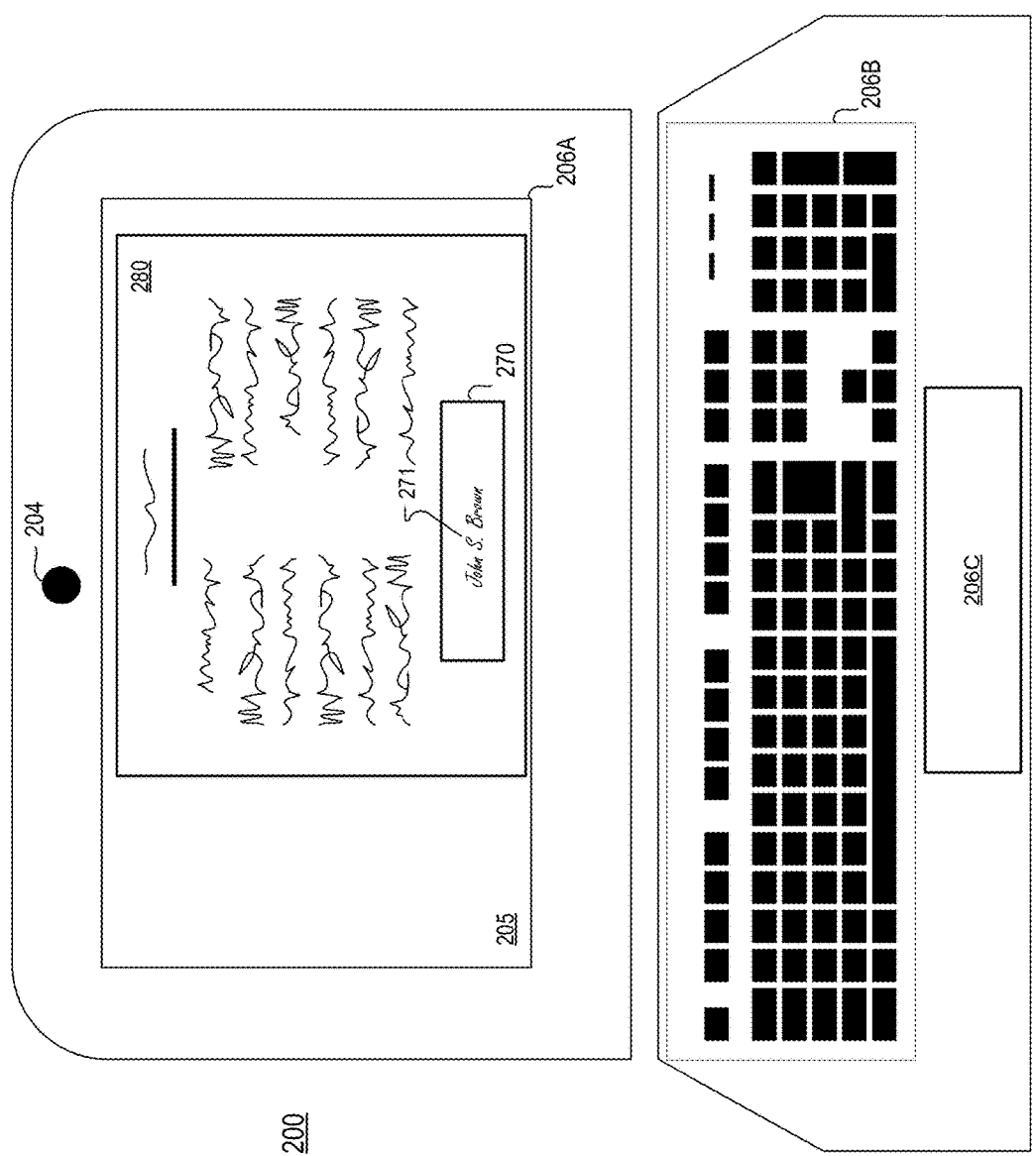
FIG. 2 illustrates a block diagram of an example user device for biometric authentication of an e-signature, in accordance with an embodiment of the disclosure.
Figure 3:
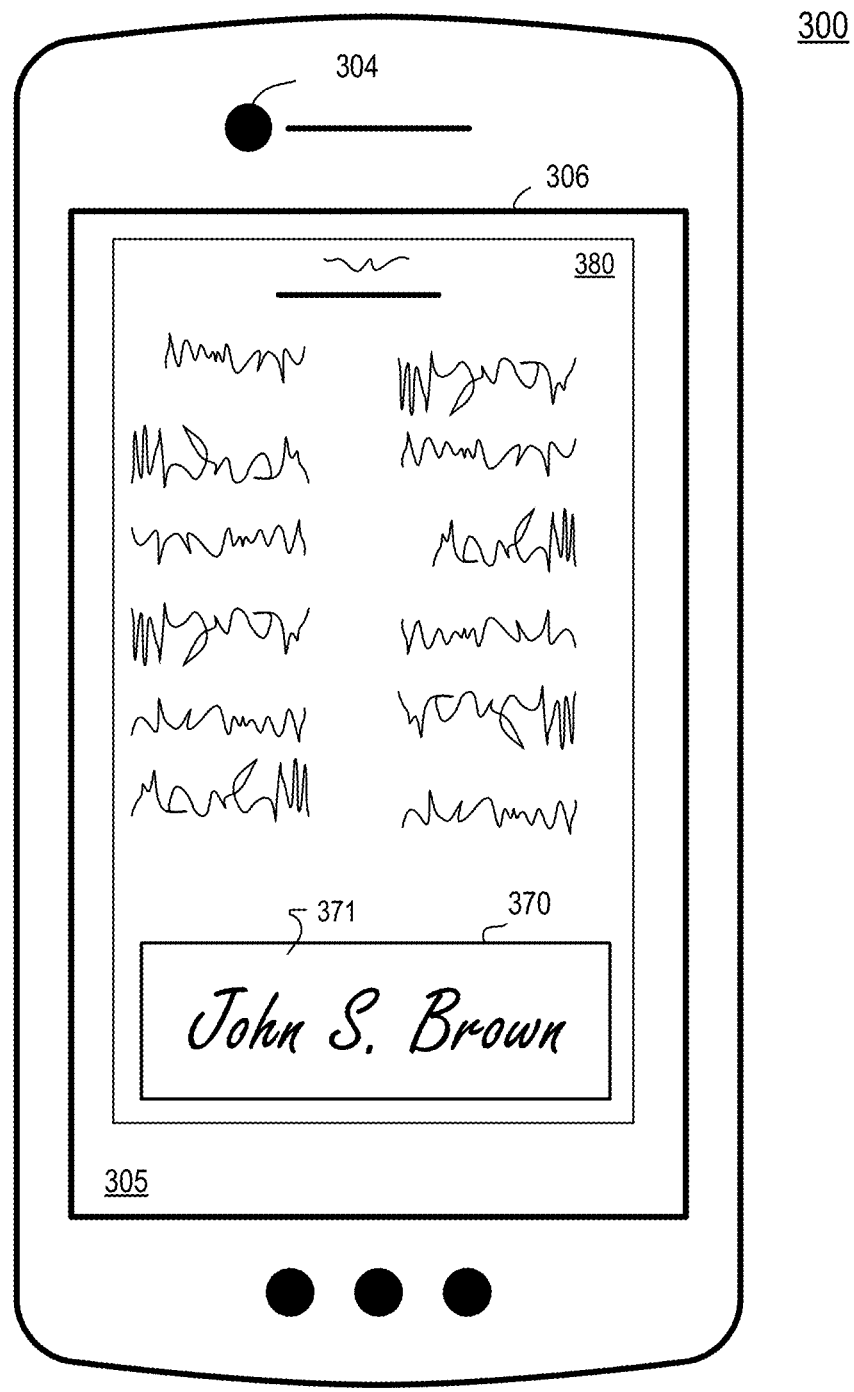
FIG. 3 illustrates a block diagram of an example user device for biometric authentication of an e-signature, in accordance with an embodiment of the disclosure.

FIGS. 2 and 3 illustrate block diagrams of example user devices for biometric authentication of an electronic signature, in accordance with an embodiment of the disclosure. FIG. 2 illustrates a laptop computer 200 including a keyboard 206B, touchpad 206C, and a display 205 overlaid by a touchscreen 206A. Laptop computer further includes a camera 204. Laptop 200 may incorporate some or all of the features and components of user device 100. In FIG. 2, a document 280 is rendered to display 205 and a signature block 270 for an e-signature 271 is also displayed. The e-signature 271 may be inputted into signature block 270 by way of touchpad 206C, physical keyboard 206B, or by touching a stylus or finger to touchscreen 206A, for example. When the user begins to generate the e-signature 271 in signature block 270, the camera 204 may be activated to capture the contemporaneous signature image(s) 139. Since the camera 204 is generally configured to face the user, the camera 204 will be positioned to capture images that include all or at least a portion of the user's face or eyes while they interact with the inputs 206A, 206B, and/or 206C.

FIG. 3 illustrates an example smartphone 300 having a touchscreen 306 layered with display 305. Smartphone 300 may incorporate some or all of the features and components of user device 100. Smartphone 300 includes a forward-facing camera 304. In FIG. 3, a document 380 is rendered to display 305 and a signature block 370 for an e-signature 371 is also displayed. The e-signature 371 may be inputted into signature block 370 by way of touching a stylus or finger to touchscreen 306, for example. When the user begins to generate the e-signature 371 in signature block 370, the forward-facing camera 304 may be activated to capture the contemporaneous signature image(s) 139. Since the camera 304 is generally configured to face the user while the user interacts with touchscreen 306, the camera 304 will be positioned to capture images that include all or at least a portion of the user's face or eyes while they interact with the touchscreen 306.

Figure 4:
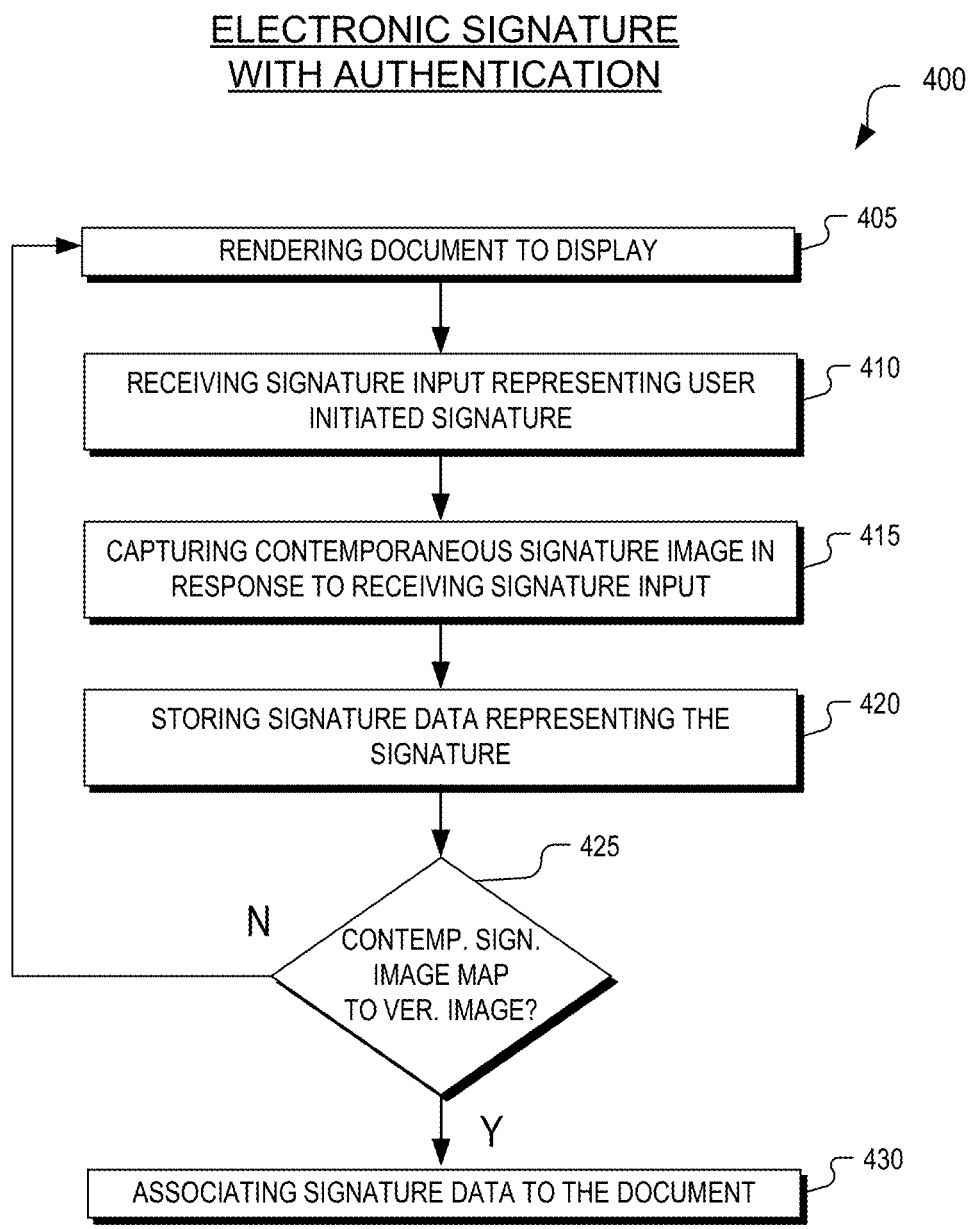
FIG. 4 illustrates a flow chart of an example process of authenticating an e-signature using a contemporaneous signature image, in accordance with an embodiment of the disclosure.

FIG. 4 illustrates a flow chart of an example process 400 of authenticating an e-signature using a contemporaneous signature image, in accordance with an embodiment of the disclosure. Process 400 may be executed by one or more of the user devices disclosed herein. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

In process block 405, a document (e.g. document 132, 280, or 380) is rendered to a display (e.g. 105, 205, or 305).

In process block 410, a signature input representing a user initiating an electronic signature with the input interface (e.g. 106) is received by the input interface. The signature input is received subsequent to rendering the document to the display.

In process block 415, in response to receiving the signature input via the input interface, a contemporaneous signature image is captured with an image sensor (e.g. 104) to capture a user inputting the remainder of the electronic signature while the user is inputting the remainder of the electronic signature.

In one example of process blocks 405-415, after the document is rendered to the display, the user may begin e-signing the document by touching a touchpad to begin the electronic signature, selecting (with a touchpad or computer mouse) a signature interface (e.g. 270 or 370), touching a touchscreen within a signature interface to e-sign, or typing a forward slash on a keyboard to begin e-signing the document. When the user device senses that the user is generating an e-signature, it triggers the image sensor to capture (using one or more discrete still images or video capture) the user inputting the remainder of the electronic signature. In an embodiment where the image sensor is a forward-facing image sensor on a smartphone or a tablet, for example, the image sensor is positioned to capture in an image all or a portion of a e-signer's face while they e-sign. Of course, contemporaneous signature images of the face, eyes, or fingerprint can also be captured while the e-signature is generated, as described above.

In process block 420, the signature data representing the electronic signature received by the input interface is stored. In one embodiment, it is stored in a memory included in the user device.

In process block 425, the contemporaneous signature image is compared to a verification image. The verification image may be included in a user profile of the owner/user of the device. The user profile and/or the verification image may be stored in memory of the user device. In one embodiment, the verification image is stored in a remote device (e.g. a server). If the contemporaneous verification image maps to the verification image, process 400 proceeds to process block 430 where the signature data is associated with the document. If the contemporaneous verification image fails to map to the verification image, process 400 may return to process block 405.

In one embodiment, the contemporaneous signature image and/or the verification image is sent to an image processing server for analyzing whether the contemporaneous verification image maps to the verification image in order to leverage the processing power of a cloud server. In one embodiment, the user device sends the contemporaneous signature image and a verification pointer to the image processing server. When the image processing server receiver the verification pointer, the image processing server may fetch the verification image from a network location or memory location (referenced by the verification pointer) of a separate server that is remote from both the user device and the image processing server. The user device may then receive a a verification decision message from the image processing server where the verification decision message indicates whether the contemporaneous signature image maps to the verification image. Based on the verification decision message, the user device may associate the signature data to the document.

Figure 5:
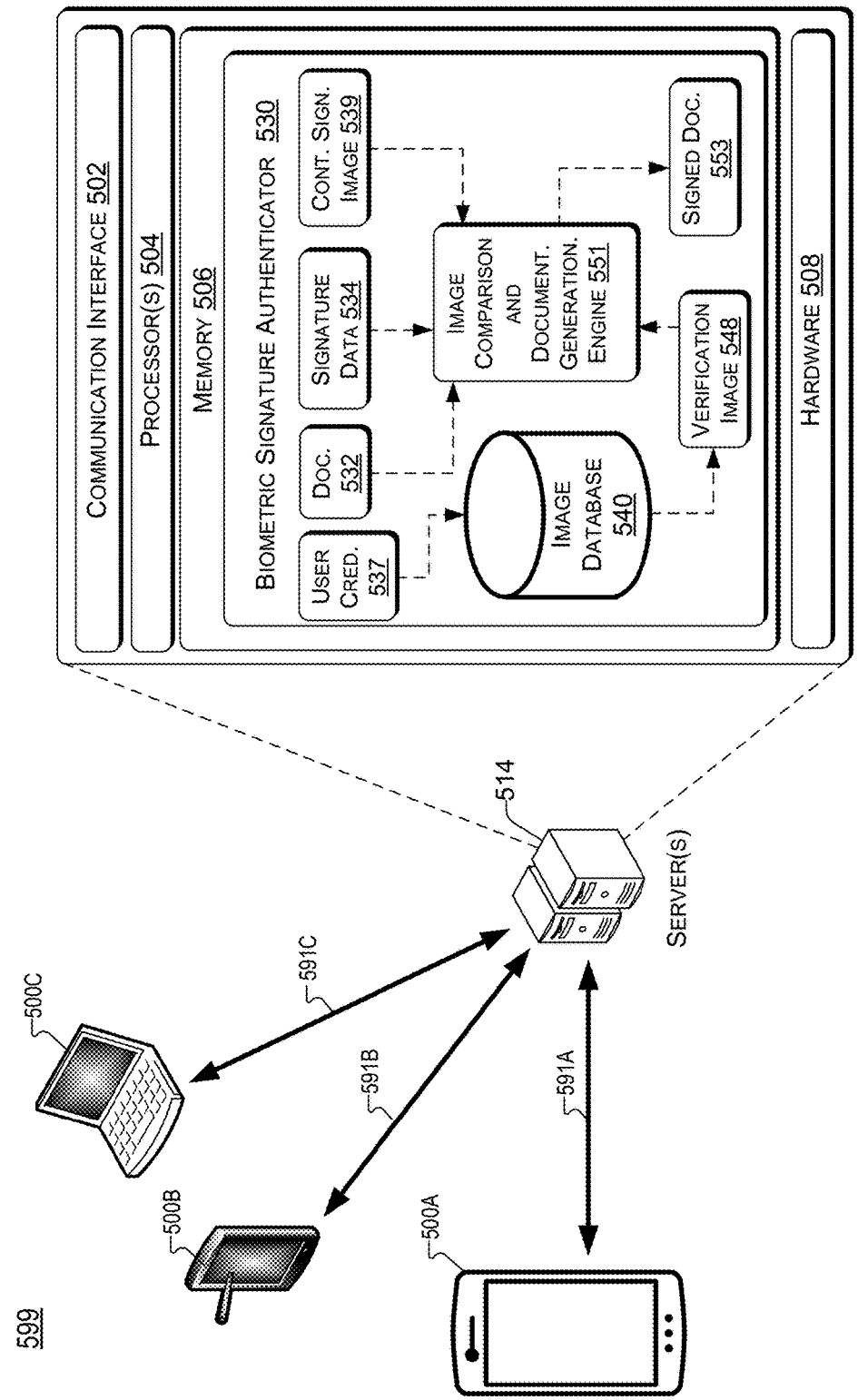
FIG. 5 illustrates a block diagram of an example system for biometric authentication of an e-signature, in accordance with an embodiment of the disclosure.

FIG. 5 illustrates a block diagram of an example system 599 for biometric authentication of an e-signature, in accordance with an embodiment of the disclosure. System 599 includes one or more user devices 500A, 500B, and/or 500C. The user's devices 500A, 500B, and 500c are communicatively coupled to server(s) 514 via communication channels 591A, 591B, and 591C, respectively. Communication channels 591 may include wired or wireless communications utilizing IEEE 802.11 protocols, BlueTooth, SPI (Serial Peripheral Interface), I²C (Inter-Integrated Circuit), USB (Universal Serial Port), CAN (Controller Area Network), cellular data protocols (e.g. 3G, 4G, LTE, 5G), or otherwise.

FIG. 5 illustrates a server-side embodiment where at least a portion of the e-signature authentication processing is performed by a computing device other than the user device 100. This may save battery life of user device 100 and/or be a more efficient use of network resources. In FIG. 5, server(s) 514 may include communication interface 502, one or more processors 504, memory 506, and hardware 508. The communication interface 502 may include wireless and/or wired communication components that enable the server(s) 514 to transmit data to and receive data from other networked devices. The hardware 508 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 506 may be implemented using computer-readable media, such as computer storage media. Computer-readable media may include two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

Memory 510 includes biometric signature authenticator module 530. In the illustrated embodiment, biometric signature authenticator module 530 includes user credentials 537, document 532, signature data 534, and one or more contemporaneous signature images 539. In the illustrated embodiment, biometric signature authenticator module 530 also includes image database 540, verification image(s) 548, image comparison and document generation engine (ICDGE) 551, and signed document 553.

Figure 6:
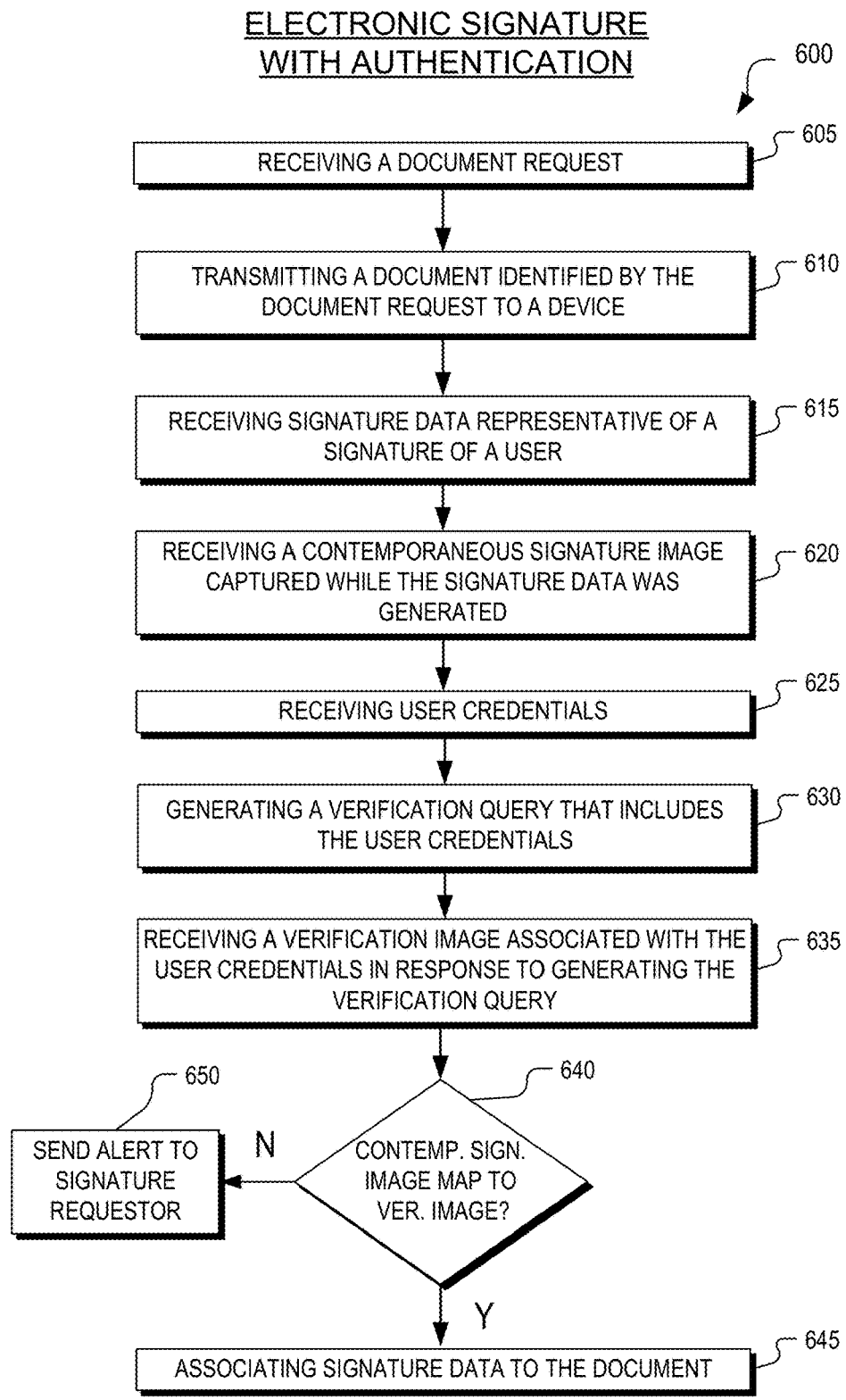
FIG. 6 illustrates a flow chart of an example process of authenticating an e-signature using a contemporaneous signature image, in accordance with an embodiment of the disclosure.

FIG. 6 illustrates a flow chart of an example process 600 of authenticating an e-signature using a contemporaneous signature image, in accordance with an embodiment of the disclosure. Process 600 may be performed by server(s) 514. Users may use any of devices 500A, 500B, or 500C to generate an e-signature. The order in which some or all of the process blocks appear in process 600 should not be deemed limiting. Rather, one of ordinary skill in the art having the benefit of the present disclosure will understand that some of the process blocks may be executed in a variety of orders not illustrated, or even in parallel.

In process block 605, a document request is received with the communication interface (e.g. 502). Any of devices 500A, 500B, or 500C may generate a document request, for example, and transmit the document request via communication channel(s) 591. The document request may identify a document for signature using a document identifier.

In process block 610, the document identified by the document identifier is transmitted to the user device, with the communication interface, via communication channel 591. The document may be transmitted to the user device in response to receiving the document request.

In process block 615, signature data (e.g. 534) representative of a signature of the user inputted into one of the devices 500 is received with the communication interface.

In process block 620, one or more contemporaneous signature images 539 is received with the communication interface. The contemporaneous signature image was captured while the signature data representative of the signature was generated by the user.

In process block 625, user credentials (e.g. 537) are received with the communication interface. In one embodiment, the user credentials are the same user credentials to access or unlock the user device 500. In one embodiment, the user credentials are associated with an application of the user device 500. In one embodiment, the user credentials are associated with a web browser application of the user device 500.

In process block 630, a verification query is generated that includes the user credentials as an argument. In one embodiment, image database 540 stores a plurality of user profiles that include verification image(s) linked to each user profile. Image database 540 may be stored locally on server 514 (as illustrated in FIG. 5) or may be stored on a server remote to server 514. By querying the image database 540 with a verification inquiry including the user credentials, the image database 540 may respond with the verification image (e.g. 548) associated with the user credentials 537, as in process block 635.

In process block 640, the contemporaneous signature image (e.g. 539) is compared to a verification image (e.g. 548). If the contemporaneous verification image maps to the verification image, process 600 proceeds to process block 645 where the signature data is associated with the document. In FIG. 5, ICDGE 551 generates a signed document 553 that includes document 532 and signature data 534 when the contemporaneous signature image 539 maps to verification image 548. If the contemporaneous verification image fails to map to the verification image, process 600 may transmit an alert to a signature requestor where the alert includes the document identifier and/or the document. For example, if user device 500C provided document 532 for e-signature by a user of device 500A and user device 500A provided a contemporaneous signature image that did not map to a verification image 548 of user device 500A, it is possible that a fraudulent e-signature was attempted by a nefarious user of device 500A. Hence, the alert generated in process block 650 may alert the signature requestor user of device 500C that a potentially fraudulent e-signature was attempted. Notably, if the contemporaneous signature image does not map to the verification image in process block 640, the signature data is not associated with the document. Therefore, ICDGE 551 would not generate signed document 553, in FIG. 5.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A device comprising:
a camera configured to initiate image captures of received imaging light;
a display disposed to emit display light; and
an input interface, wherein the device is configured to:
render, with the display, a document;
receive, via the input interface, a signature input representing a user initiating an electronic signature with the input interface;
in response to receiving the signature input with the input interface, capturing a contemporaneous signature image with the camera to capture the user inputting a remainder of the electronic signature, the contemporaneous signature image includes at least a portion of an eye of the user;
storing signature data representing the electronic signature received by the input interface;
comparing the contemporaneous signature image to a verification image; and
associating the signature data to the document when the contemporaneous signature image maps to the verification image.

2. The device of claim 1, wherein the device further comprises a communication module coupled to send and receive data, and wherein comparing the contemporaneous signature image to the verification image includes:
transmitting, with the communication module, a verification request from the device to a computing device, wherein the verification request includes user credentials of the user of the device; and
receiving, with the communication module, the verification image from the computing device.

3. The device of claim 1 further comprising a memory, wherein the verification image is stored in the memory, and wherein comparing the contemporaneous signature image to the verification image includes accessing the verification image from the memory.

4. The device of claim 1, wherein the device further comprises a communication module coupled to send and receive data, and wherein comparing the contemporaneous signature image to the verification image includes:
transmitting, with the communication module, the contemporaneous signature image and a verification pointer to an image processing server, wherein the verification pointer provides a location where the verification image is stored, the location being external to the device and external to the image processing server; and receiving, with the communication module, a verification decision message from the image processing server, the verification decision message indicating whether the contemporaneous signature image maps to the verification image.

5. The device of claim 1, wherein the verification image includes eye data of eyes of the user.

6. The device of claim 1, wherein the input interface includes a touchscreen layered with the display.

7. The device of claim 1, wherein the input interface includes a touchpad.

8. The device of claim 1, wherein the input interface includes a software generated signature block overlaid over the document.

9. The device of claim 1, wherein the camera includes a complementary metal-oxide-semiconductor (CMOS) image sensor.

10. A computer-implemented method comprising:
rendering, with a display, a document;
receiving, via an input interface, a signature input representing a user initiating an electronic signature with the input interface;
in response to receiving the signature input via the input interface, capturing a contemporaneous signature image with a complementary metal-oxide-semiconductor (CMOS) image sensor to capture the user inputting a remainder of the electronic signature while the user is inputting the remainder of the electronic signature, wherein the contemporaneous signature image includes at least a portion of an eye of the user;
storing signature data representing the electronic signature received by the input interface;
comparing the contemporaneous signature image to a verification image; and
associating the signature data to the document when the contemporaneous signature image maps to the verification image.

11. The computer-implemented method of claim 10, wherein comparing the contemporaneous signature image to the verification image includes:
transmitting a verification request from a first device to a second device, wherein the first device includes the display, the input interface, and the CMOS image sensor; and
receiving the verification image from the second device.

12. The computer-implemented method of claim 10, wherein comparing the contemporaneous signature image to the verification image includes accessing the verification image from a memory of a first device that also includes the display, the input interface, and the CMOS image sensor.

13. The computer-implemented method of claim 10, wherein the input interface includes a touchscreen layered with the display.

14. The computer-implemented method of claim 10, wherein the contemporaneous signature image is included in a video file captured by the CMOS image sensor.

15. The computer-implemented method of claim 10, wherein the verification image includes eye data of eyes of the user.

16. The computer-implemented method of claim 10 further comprising:
transmitting an alert including a document identifier identifying the document to a signature requestor device when the contemporaneous signature image fails to map to the verification image.

\* \* \* \* \*